Figure 3:
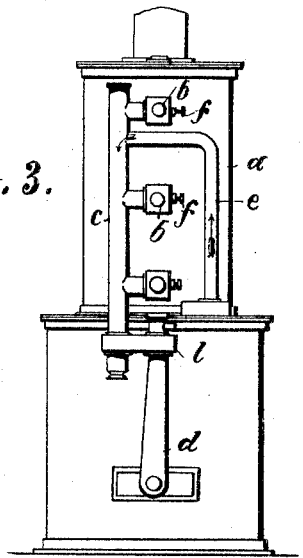

No. 776,947. PATENTED DEC. 6, 1904.
P. SCHMIDT.
GAS GENERATOR.
APPLICATION FILED DEC. 8, 1903.
NO MODEL. 3 SHEETS—SHEET 1.
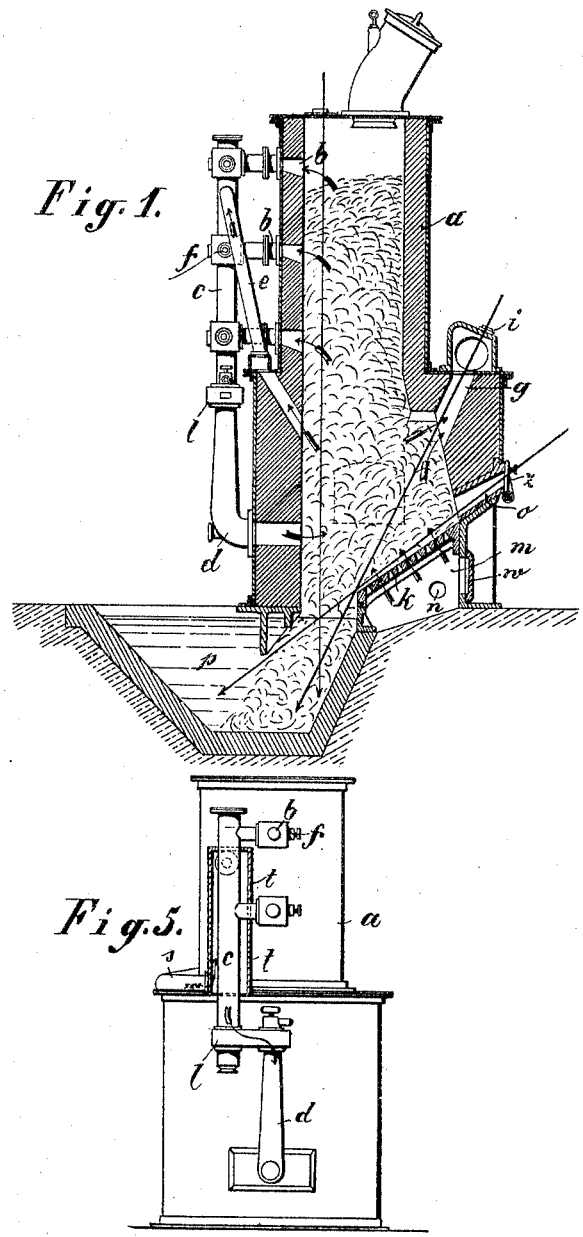

No. 776,947. PATENTED DEC. 6, 1904.
P. SCHMIDT.
GAS GENERATOR.
APPLICATION FILED DEC. 8, 1903.
NO MODEL. 3 SHEETS—SHEET 2.
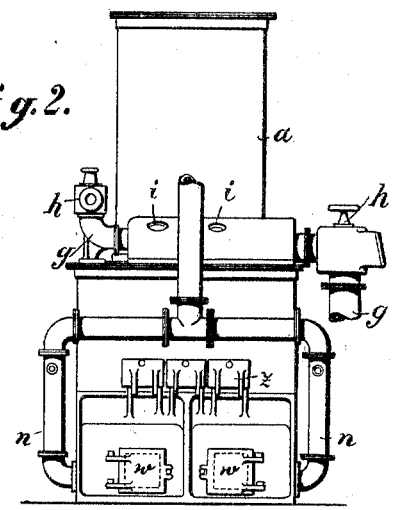
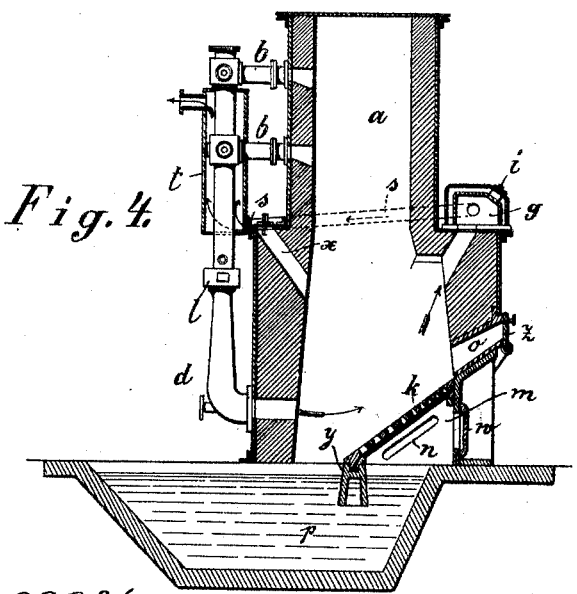
Witnesses: Inventor
Paul Schmidt
By James L. Norris
Atty.

No. 776,947. PATENTED DEC. 6, 1904.
P. SCHMIDT.
GAS GENERATOR.
APPLICATION FILED DEC. 8, 1903.
NO MODEL. 3 SHEETS—SHEET 3.

Witnesses:
James L. Norris, Jr.

Inventor
Paul Schmidt
By James L. Norris.
Atty.

No. 776,947.

Patented December 6, 1904.

UNITED STATES PATENT OFFICE.

PAUL SCHMIDT, OF HANOVER, GERMANY.

GAS-GENERATOR.

SPECIFICATION forming part of Letters Patent No. 776,947, dated December 6, 1904.

Application filed December 8, 1903. Serial No. 184,297. (No model.)

*To all whom it may concern:*

Be it known that I, PAUL SCHMIDT, engineer, of 15 Theaterplatz, Hanover, Germany, have invented certain new and useful Improvements in Apparatus for the Production of Water-Gas, Producer-Gas, and the Like, of which the following is a specification.

This invention relates to a generating apparatus for the production of water-gas, producer-gas, and the like, and has for its object an improvement in the construction of those generators in which by means of a steam-injector the gases containing tar generated above the body of fuel and in the upper zones of the latter are drawn off and injected in the lower hottest part of the fuel-column for the purpose of effecting their decomposition and conversion into carbon monoxid and other permanent combustible gases. It has been shown that in the operation of such generators or producers a series of disadvantages arise; and the present invention has for its object to do away with these. The gases generated in the upper part of the apparatus consist to a large extent of heavy easily-condensable hydrocarbons that condense more or less in the pipes conveying their gases to the lower part, and therefore pass in a liquid condition in the lower part of the fuel-column. By this means a considerable amount of heat is lost, the fuel is considerably cooled down on that side where the introduction of the liquid hydrocarbons takes place, as can easily be seen through sight-holes, the fuel being considerably darker near where the liquid enters than at a greater distance therefrom and is consequently of a lower temperature. A portion of the liquefied gas also drops down into the water seal of the apparatus and is therefore lost. The consequence of the unequal degree of combustion resulting from the above is the formation of cavities in the body of fuel, and consequently want of uniformity in the production of combustible gas and an unequal descent of the fuel. These disadvantages are obviated according to the present invention by preventing the condensation of the tarry gases drawn off from the upper layers of fuel on its way to the lower layers by maintaining them during their transit at a high temperature by means, either directly or directly, of highly-heated gases or vapors. This can be effected, by way of example, by causing generator-gas to pass from the hot zone of the generator through a suitable channel into the pipe through which the gases and vapors given off at the upper part descend to the lower strata, so as to be directly mixed with such gases or vapors, or the said hot generator-gases may be made to pass through a jacket surrounding the said pipe on their way to the place of utilization.

The above-described method of operating can only be employed with advantage if the central inverted-V-shaped fire-grate heretofore generally employed is replaced by a lateral inclined grate arranged opposite the part of the combustion-chamber where the downward-conducted gases enter, so that the air-currents entering through the fire-grate and the injected hydrocarbon vapors impinge upon each other at an angle of about ninety degrees in the zone of incandescent fuel, so as to effect their intimate mixture and a perfect conversion of the hydrocarbons into carbon monoxid and other permanent gases. By this arrangement of an inclined grate the further advantage is obtained as compared with gas-generators with V-shaped grate that the hydrocarbons that are led downward to below the gas-outlet can no longer ascend along the walls of the chamber so as to escape undecomposed through the gas-outlet, as was heretofore the case. As in the part of the fuel-column where the gases descending from above are blown in again the consumption of air-blast is greater than at the other parts, the air-openings between the bars at the lower part of the grate are made larger than those of the upper part. In order to enable the inclined grate to be conveniently cleared and also to prevent the formation of cavities in the incandescent fuel, suitable stoking-holes are provided above the grate through which the latter can be conveniently cleared of slag. The grate is arranged either over a box through which the air-blast is supplied or directly over the water seal. The last-named arrangement has the advantage that the ashes fall from the grate directly into the water seal, and consequently that the ash-pit does not require clearing. The fire-grate can be made arched instead of flat, thus enabling the air-blast to be distributed more uniformly over a greater surface. Stoking-openings are also provided in the neighborhood of the gas-outlet or on the side opposite thereto for the purpose of preventing the formation of cavities in the fuel.

On the accompanying drawings are shown several constructions of gas-generators for carrying out the above-described invention.

Figure 6:
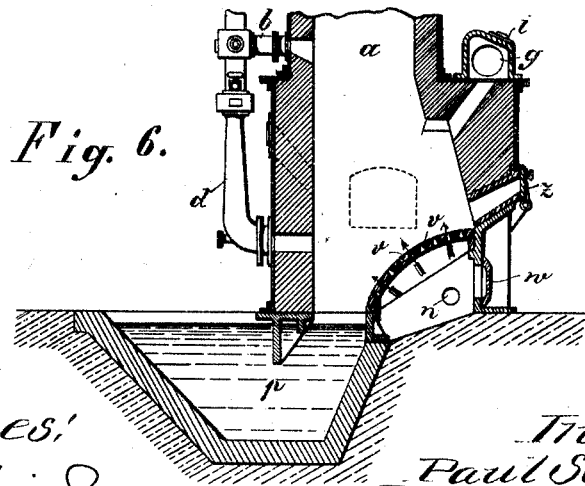

Figure 1 shows a vertical transverse section of one arrangement. Fig. 2 shows a front view; Fig. 3, a back view. Fig. 4 is a vertical tranverse section of another arrangement; Fig. 5, a back view of the same, and Fig. 6 a part-vertical transverse section of a modification with arched fire-grate.

The gas-generator $a$ is constructed with a number of escape-channels $b$ in the upper layers of the fuel-column and also in the space above the latter, which channels communicate with one and the same downdraft-pipe $c$. The gases are drawn down the latter and injected into the lower hottest zone of the fuel-column by means of a steam-injector at $d$. From this zone a pipe $e$ leads up into the upper part of the downdraft-pipe $c$, so that a portion of the highly-heated gases are drawn from such zone up through pipe $e$ into $c$, where they mix with the colder gases containing tar descending from the upper layers and in thus imparting more heat thereto prevent the condensation thereof by cooling during the descent. As with the construction shown the gases and vapors are drawn off from all the different zones by means of a single injector $d$, the branch pipes $b$, leading into $c$, are provided with suitable dampers or valves $f$ in order that the quantity of gas drawn off from each zone may be separately regulated.

Instead of causing the hot gases coming from the lower zone to mix directly with the gases from above, and consequently to pass back with these into the lower part of the generator, the arrangement shown at Figs. 4 and 5 can be employed where the downdraft-pipe $c$ is provided with a jacket $t$, with the lower end of which communicates a pipe $s$, connected at its other end with the discharge-pipe $g$ for the hot generator-gases, a portion of which consequently passes through the jacket, so as to impart their heat to the gases and vapors in pipe $c$, eventually passing off again through a branch in the upper end of the jacket to the place of consumption.

For effecting the perfect decomposition of the introduced hydrocarbons the central V-shaped grate usually employed is replaced by an inclined grate $k$, arranged at the side of the generator opposite that at which the upper gases are introduced, such grate being either arranged at Figs. 1 and 2 above a box $m$, that serves both as ash-pit and for the introduction of the air-blast supplied from a pipe $n$, or, as shown at Fig. 4, the grate is supported on a bridge $y$, so as to overhang the water seal $p$. Doors $w$ are provided below the grate for clearing the ash-pit and grate. For preventing the grate-bars being clogged with slag stoking-holes $o$ are provided above the same, closed by doors $z$. By this arrangement of the fire-grate in conjunction with stoking-holes the grate can be kept clear of slag, so as to admit a sufficient supply of air-blast.

In order to secure a uniform production of generator-gas and in particular to prevent the formation of cavities through which on the one hand the hydrocarbons could pass direct into the gas-outlet and on the other hand a caking of the fuel might take place, other stoking-holes, such as $i$ $i$, may be provided above the holes $o$ on the same side of the generator or holes $x$ on the opposite side, as at Fig. 4.

A very uniform combination is obtained by making the slots or holes of the grate-surface that are nearest to the lower inlet-opening of the downdraft-pipe $c$ of a larger sectional area than those farther away, so as to obtain an increased supply of air-blast at that point. The inclined grate can also in some cases be made arched, as at $v$, Fig. 6, whereby, as before stated, the air-blast will be more uniformly distributed over the hot zone of the fuel.

The discharge-pipe $g$ for the generator-gas is provided with a shut-off valve $h$ for enabling the gases to be blown out of the generator on starting.

The downdraft-pipe $c$ is provided with a dust-collector $l$ in the known manner.

Having now particularly described and ascertained the nature of my said invention and in what manner the same is to be performed, I declare that what I claim is—

1. An apparatus for generating gas involving a generator, a joint downdraft-pipe communicating at its lower end with the generator at the zone of incandescence, channels for leading off the gases and vapors from the upper part of the generator into said downdraft-pipe, an ejector extending in said downdraft-pipe and a pipe communicating with the downdraft-pipe and with the generator for introducing gas in the downdraft-pipe from the most heated part of the generator.

2. An apparatus for generating gas involving a generator, a joint downdraft-pipe communicating at its lower end with the generator at the zone of incandescence, channels for leading off the gases and vapors from the upper part of the generator into said downdraft-pipe, an ejector extending in said downdraft-pipe, a pipe communicating with the downdraft-pipe and with the generator for introducing gas in the downdraft-pipe from the most heated part of the generator, and a heating-jacket surrounding said downdraft-pipe.

3. An apparatus for generating gas involving a generator, a joint downdraft-pipe communicating at its lower end with the generator at the zone of incandescence, channels for leading off the gases and vapors from the upper part of the generator into said downdraft-pipe, an ejector extending in said downdraft-pipe, a pipe communicating with the downdraft-pipe and with the generator for introducing gas in the downdraft-pipe from the most heated part of the generator, and an inclined grate arranged in said generator opposite the point of communication between said downdraft-pipe and the generator so that the vapors and gases drawn off from the upper part of the generator and to be reintroduced pass the glowing fuel nearly parallel to the grate and are completely burned.

In witness whereof I have hereunto set my hand in presence of two witnesses.

PAUL SCHMIDT.

Witnesses:
LEONORE KASCH,
ANNA PIGGED.